United States Patent [19]
Brown

[11] Patent Number: 5,913,536
[45] Date of Patent: Jun. 22, 1999

[54] AIR BAG MODULE

[75] Inventor: Louis R. Brown, Oxford, Mich.

[73] Assignee: TRW Vehicle Safety System Inc., Lyndhurst, Ohio

[21] Appl. No.: 08/598,165

[22] Filed: Feb. 7, 1996

[51] Int. Cl.⁶ .................................................. B60R 21/22
[52] U.S. Cl. ................................. 280/730.2; 280/728.2; 280/743.1
[58] Field of Search ........................... 280/782.2, 728.1, 280/729, 730.1, 730.2, 743.1

[56] References Cited

U.S. PATENT DOCUMENTS

| | | |
|---|---|---|
| 3,623,768 | 11/1971 | Capener et al. . |
| 3,664,682 | 5/1972 | Wycech . |
| 4,946,191 | 8/1990 | Putsch . |
| 5,112,079 | 5/1992 | Haland et al. . |
| 5,348,342 | 9/1994 | Haland et al. . |
| 5,524,924 | 6/1996 | Steffens, Jr. et al. ................ 280/730.2 |
| 5,556,128 | 9/1996 | Sinnhuber et al. ................... 280/730.2 |
| 5,586,782 | 12/1996 | Zimmerman et al. ............... 280/743.1 |

FOREIGN PATENT DOCUMENTS

| | | | |
|---|---|---|---|
| 646202 | 2/1994 | Australia ............................ | 280/730.1 |
| 0611684A1 | 2/1994 | European Pat. Off. . | |
| 5-139232 | 6/1993 | Japan .................................. | 280/730.1 |
| 6-227348 | 8/1994 | Japan .................................. | 280/730.2 |

*Primary Examiner*—Eric D. Culbreth
*Attorney, Agent, or Firm*—Tarolli, Sunheim, Covell Tummino & Szabo

[57] ABSTRACT

An air bag module (80) mounted in a vehicle seat back (22) includes a single air bag (90) which has a thorax portion (110), a neck portion (120), and a head portion (100). The head portion (100) of the air bag (90) is mounted on a support tube (260) for sliding movement relative to an inflator (240). Upon actuation of the inflator (240), the thorax portion (110) of the air bag (90) inflates first, in a forward direction out of the seat back (22). The head portion (100) of the air bag (90), and the support tube (260), move upward out of the top of the seat back (22). The head portion (100) then inflates in a forward direction after the thorax portion (110) inflates, into a position to protect the head of the occupant. The neck portion (120) of the air bag (90), when inflated, has a relatively small width as compared to the head portion (100) and the thorax portion (110).

8 Claims, 7 Drawing Sheets

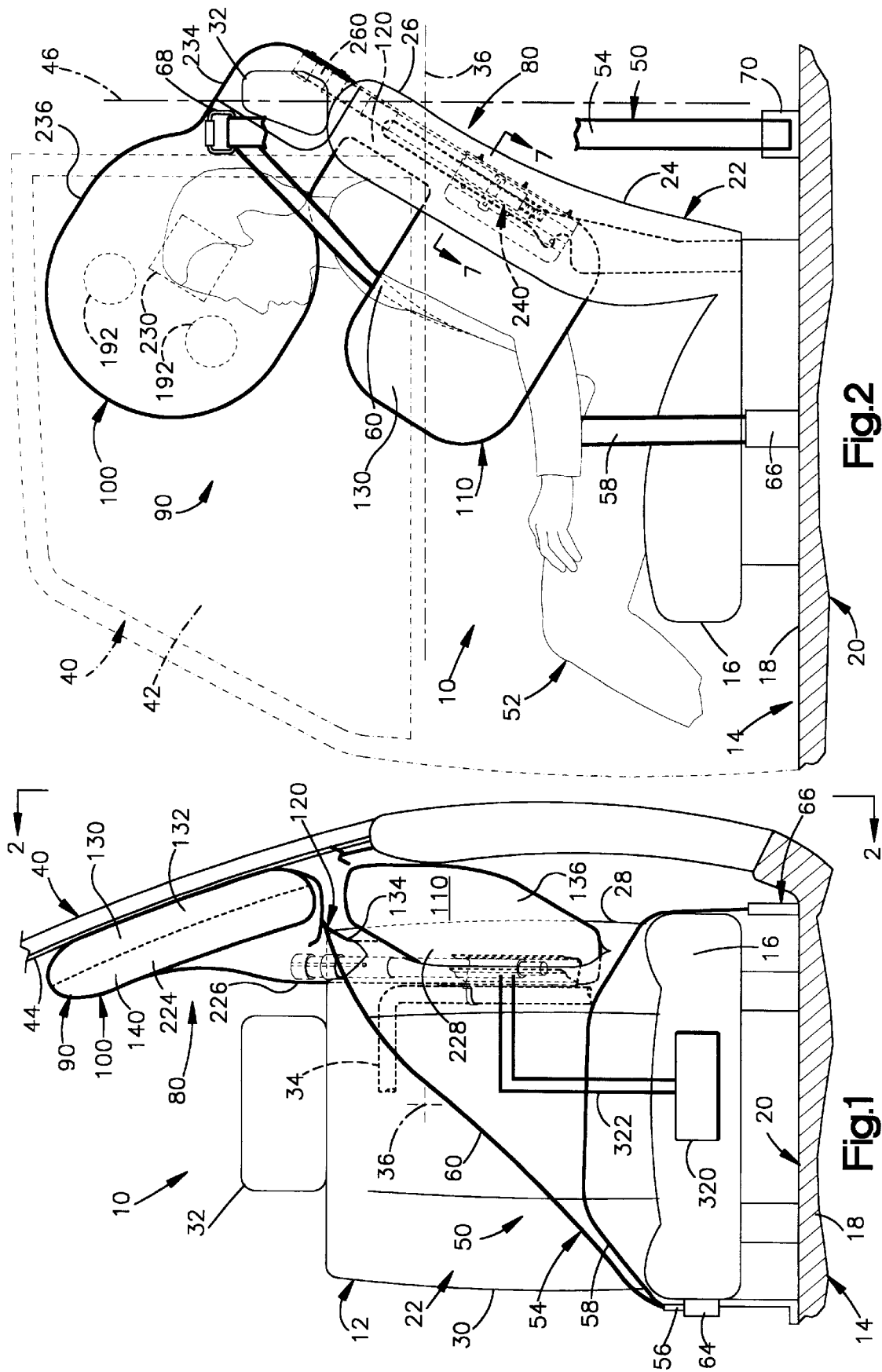

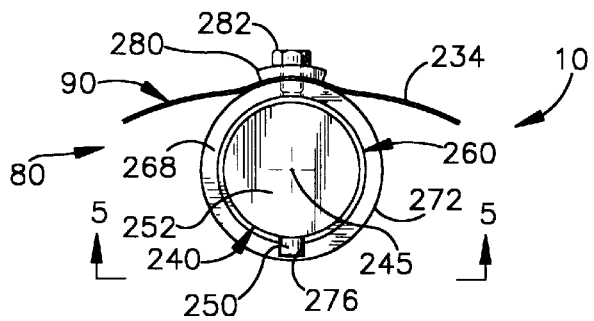
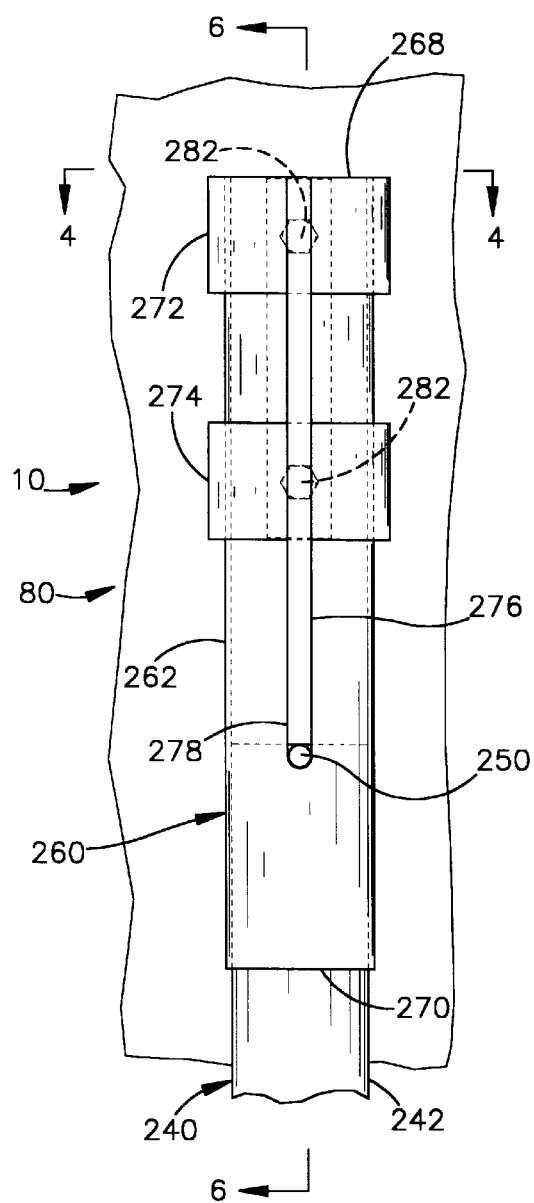
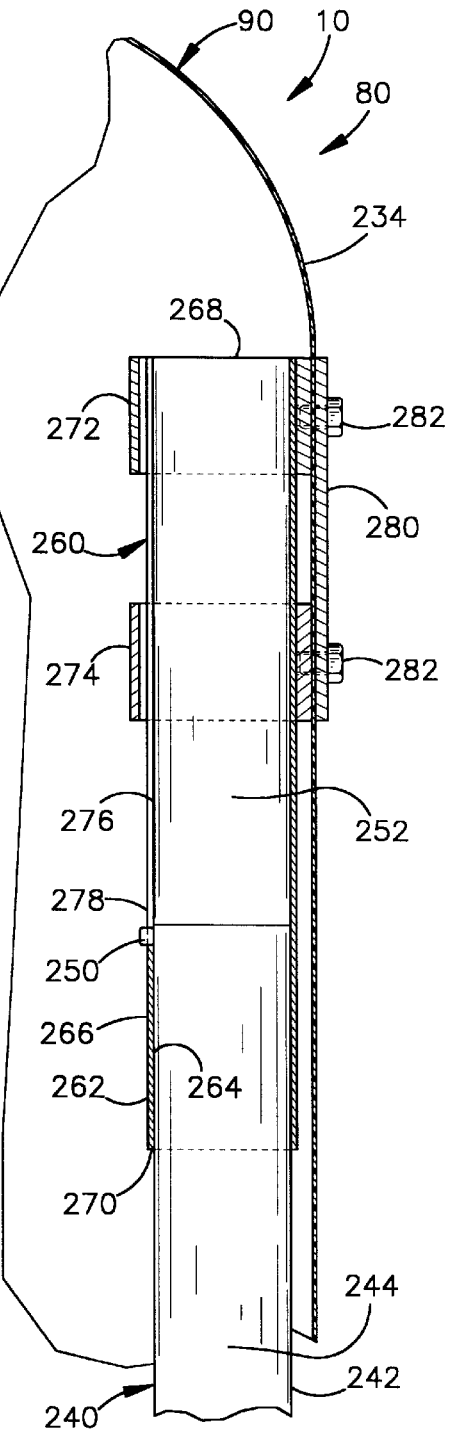

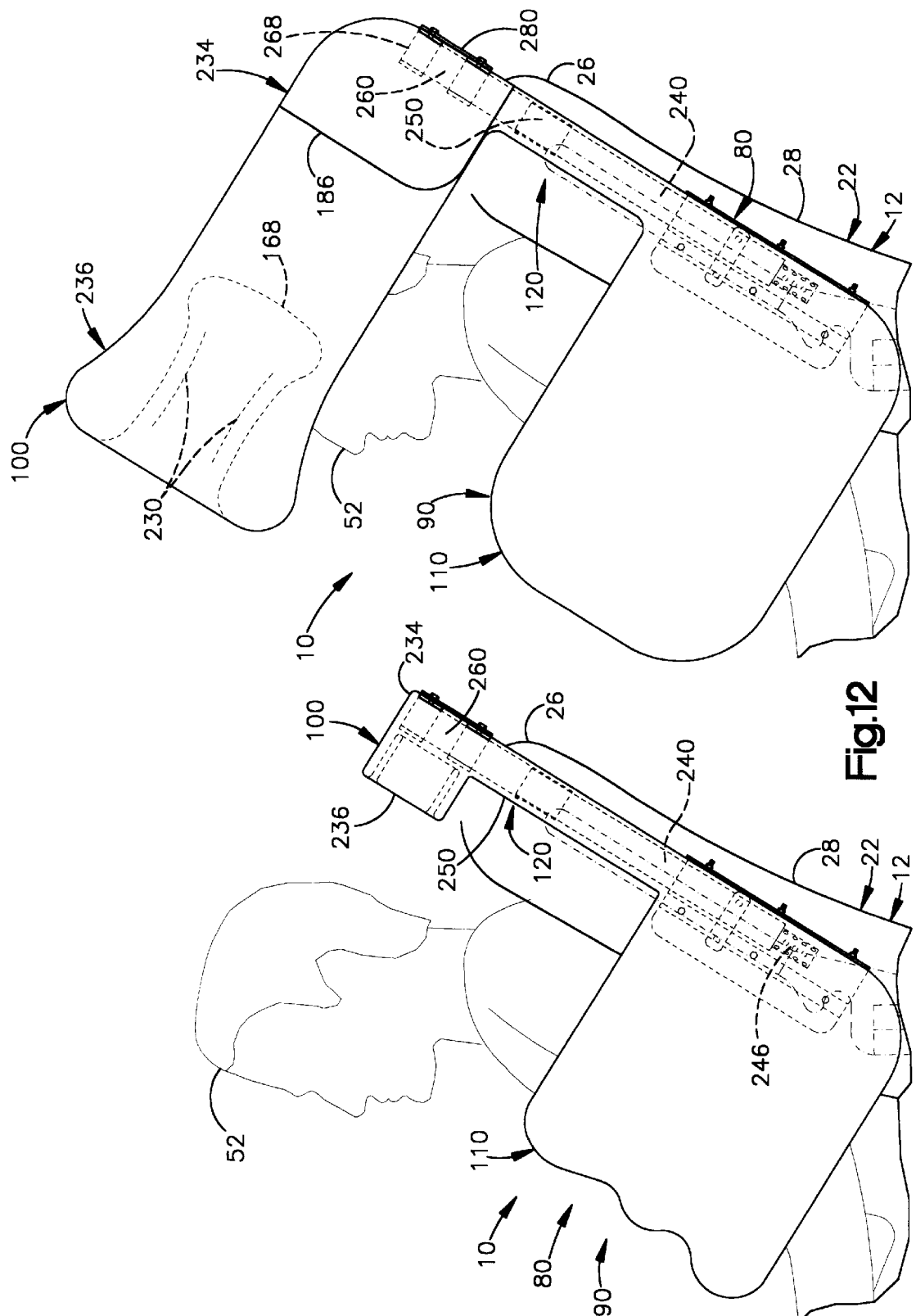

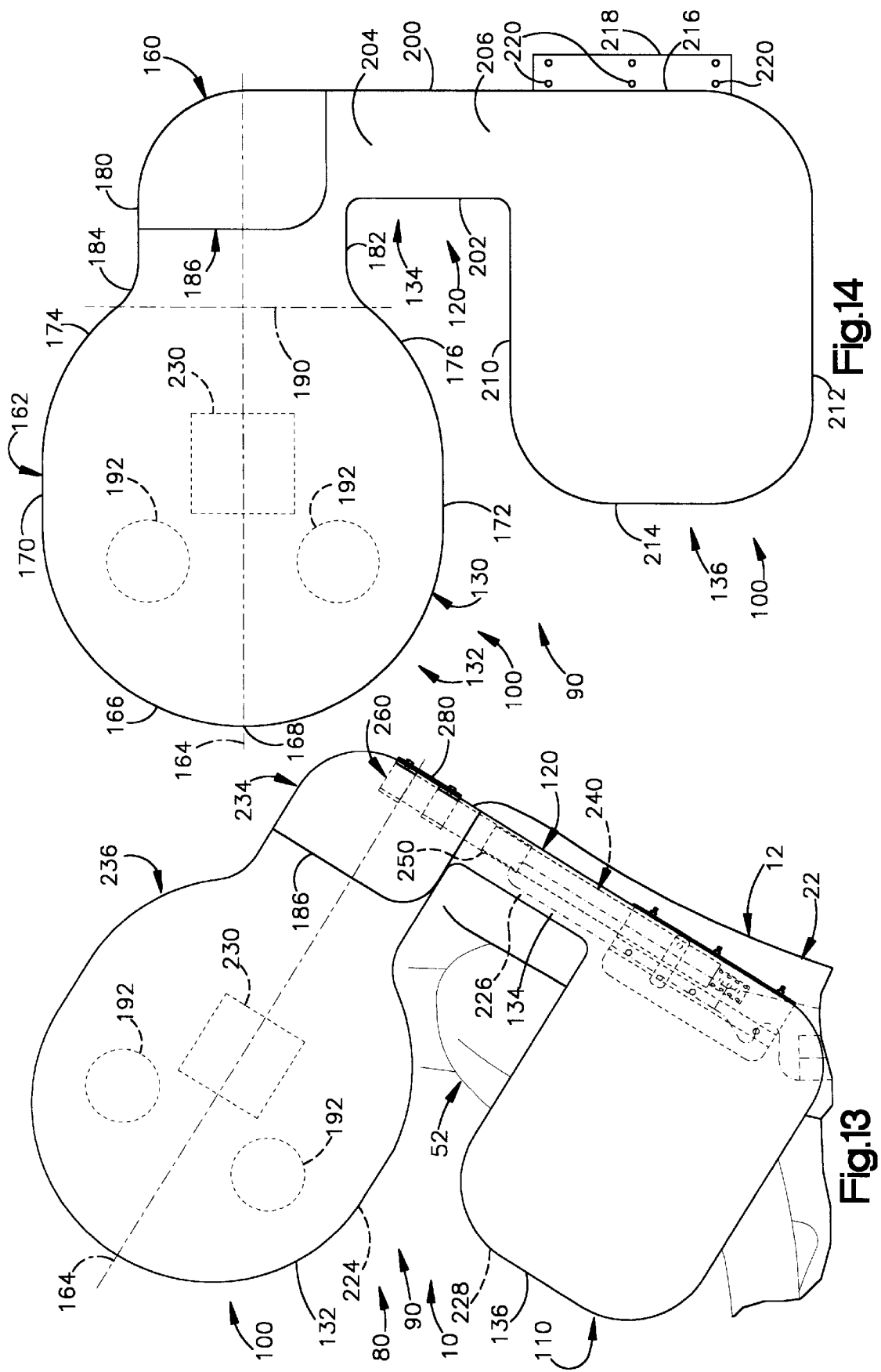

5,913,536

AIR BAG MODULE

BACKGROUND OF THE INVENTION

1. Techical Field

The present invention relates to a vehicle safety apparatus including an inflatable vehicle occupant protection device, such as an air bag. The present invention relates particularly to an air bag module including an air bag for helping to protect both the head and the thorax of a vehicle occupant in the event of a side impact to the vehicle.

2. Description of the Prior Art

It is known to inflate an air bag to help protect a vehicle occupant in th e even t of a side impact to a vehicle. The air bag is, commonly, stored in a deflated condition, together with an inflator, in the vehicle seat in which the occupant is seated. In the event of a side impact to the vehicle of a magnitude above a predetermined threshold, the inflator is actuate d an d the air bag is inflated into a position between the vehicle occupant and the adjacent vehicle door. The air bag can help protect the vehicle occupant from forcefully striking or being struck by parts of the vehicle such as the door. The air bag can also help protect the vehicle occupant from objects which might intrude through the door or a side window of the vehicle during the side impact.

SUMMARY OF THE INVENTION

The present invention is a vehicle occupant safety apparatus for helping to protect an occupant of a vehicle in the event of a side impact to the vehicle. The apparatus includes a seat for supporting an occupant of the vehicle in a seated position in the vehicle. The seat includes a seat bottom portion and a seat back. The apparatus includes an inflatable vehicle occupant protection device for, when inflated, helping to protect the vehicle occupant. The inflatable device defines a single inflation fluid volume and has a deflated, folded condition and an inflated condition. The apparatus includes an inflator for, when actuated, supplying inflation fluid to the inflatable device to inflate the inflatable device. The apparatus further includes means for mounting the inflator and the inflatable device in the vehicle seat back with the inflatable device in the deflated condition. The inflatable device has a thorax portion which defines a thorax chamber of the single inflation fluid volume and which is inflatable in a generally forward direction in the vehicle into a position to help protect the thorax of the vehicle occupant. The inflatable device has a head portion which defines a head chamber of the single inflation fluid volume and which is inflatable in the generally forward direction in the vehicle into a position to help protect the head of the vehicle occupant. The inflatable device also has a neck portion which defines a neck chamber of the single inflation fluid volume. The neck portion of the inflatable device extends between the head portion and the thorax portion and connects the head portion in fluid communication with the thorax portion. The neck portion of the inflatable device when inflated has a relatively small width as measured in the generally forward direction of the vehicle. Each one of the head portion and the thorax portion of the inflatable device when inflated has a relatively large width as measured in the generally forward direction of the vehicle. The head portion of the inflatable device unfolds and inflates after the thorax portion of the inflatable device unfolds and inflates.

In one embodiment, the apparatus includes a support for the head portion of the inflatable device when the inflatable device is in the deflated condition. The support and the head portion of the inflatable device are mounted for movement from a first position in a first direction away from the thorax portion of the inflatable device to a second position from which the head portion inflates in a second direction into a position to help protect the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a front view of a vehicle safety apparatus including a vehicle seat and an air bag module constructed in accordance with the present invention, showing the air bag in an inflated condition;

FIG. 2 is a side elevational view taken along line 2—2 of FIG. 1;

FIG. 4 is a top plan view of a portion of the air bag module of FIG. 1;

FIG. 5 is a view taken along line 5—5 of FIG. 4;

FIG. 6 is a sectional view taken along line 6—6 of FIG. 5;

FIG. 11 is a view similar to FIG. 9 showing the air bag in a second, partially inflated condition;

FIG. 12 is a view similar to FIG. 9 showing the air bag in a third, partially inflated condition;

FIG. 13 is a view similar to FIG. 9 showing the air bag in a fully inflated condition; and FIG. 14 is an elevational view of the air bag of FIG. 1 shown in a partially assembled condition.

DESCRIPTION OF A PREFERRED EMBODIMENT

Figure 3:
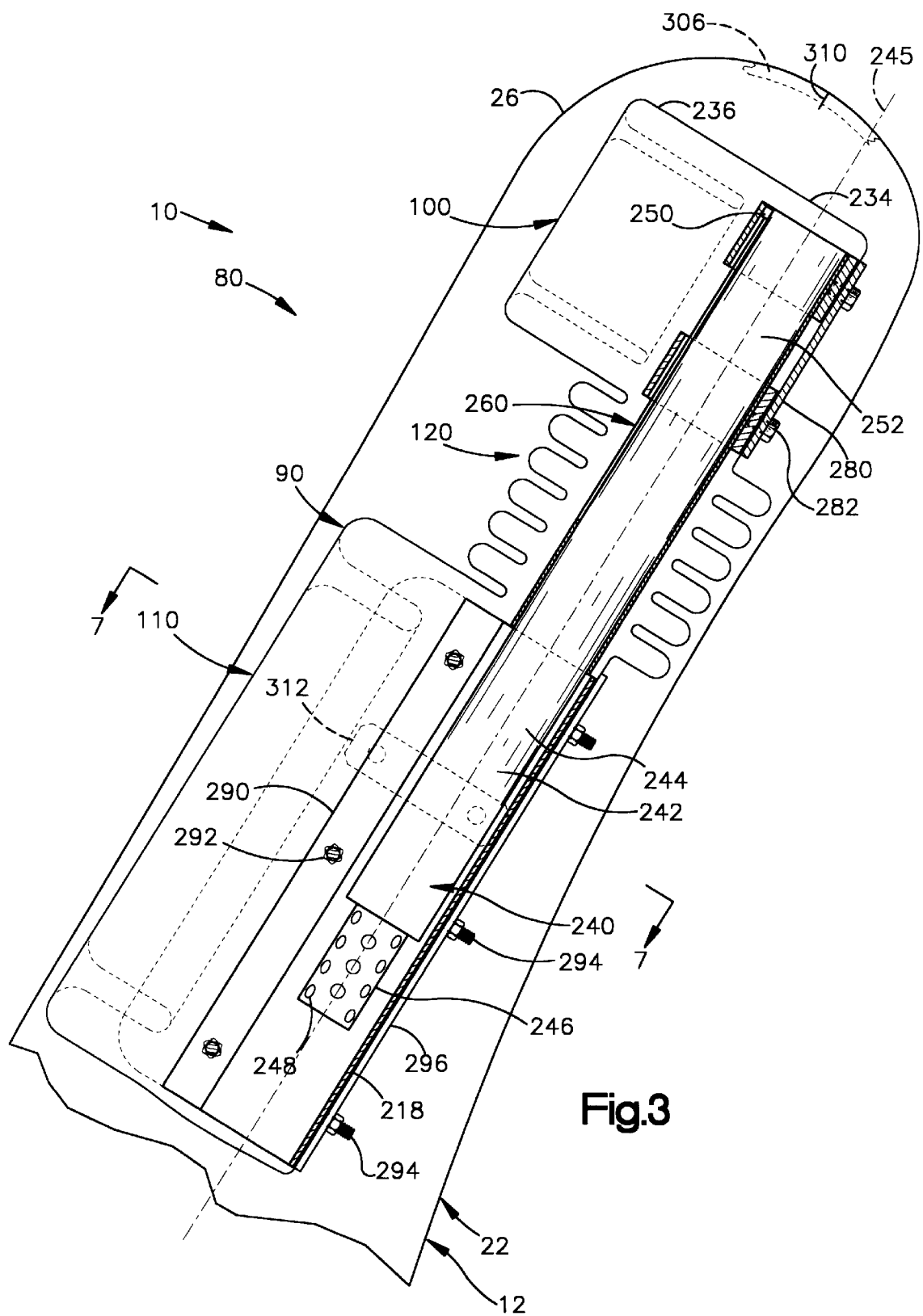
FIG. 3 is an enlarged side elevational view, partially in section, of a portion of the seat and air bag module of FIG. 1, showing the air bag in a deflated, folded condition.

The present invention relates to a vehicle safety apparatus and particularly relates to an apparatus including an inflatable vehicle occupant protection device, such as an air bag, for helping to protect a vehicle occupant in the event of a side impact to the vehicle of a magnitude sufficient to require inflation of the inflatable device to help protect the vehicle occupant. The present invention is applicable to various vehicle safety apparatus constructions. As representative of the present invention, FIGS. 1 and 2 illustrate a vehicle safety apparatus 10.

The vehicle safety apparatus 10 includes a seat 12 which is illustrated as a driver's seat for an occupant 52 (FIG. 2) of a vehicle 14. The seat 12 includes a seat bottom cushion 16 supported on a portion 18 of the body 20 of the vehicle 14. The seat 12 includes a seat back 22 connected with the seat bottom cushion 16. The seat back 22 has a lower portion 24 and an upper portion 26. The seat back 22 also has an outboard side 28 (FIG. 1) and an inboard side 30.

The seat back 22 includes a headrest 32, which is supported on or which may be formed as one piece with the upper portion 26 of the seat back. A tubular seat frame member 34 is disposed in the seat back 22. A front-to-back axis 36 (FIG. 1) extends through the seat 12 in a direction parallel to the direction of travel of the vehicle.

The vehicle body 20 includes a door 40 (FIG. 1) disposed adjacent to the seat 12. The door 40 includes a window 42 having an inner major side surface 44. A B-pillar 46 of the vehicle 14 is disposed behind (to the right of, as viewed in FIG. 2) the door 40. It should be understood that the present invention is usable in a vehicle such as a van, which has no side window adjacent to the seat 12, to help protect the vehicle occupant from contact with the side structure of the vehicle.

The vehicle 14 includes a three-point continuous loop seat belt system 50 (FIG. 1) for restraining an occupant 52 of the seat 12. The seat belt system 50 is shown in FIGS. 1 and 2 in an engaged condition. The seat belt system 50 includes a single continuous length of belt webbing 54 which is divided by a movable tongue assembly 56 into a lap portion 58 and a shoulder portion 60. The lap portion 58 of the belt webbing 54 extends across the seat bottom cushion 16 and across the lap of the occupant 52. The shoulder portion 60 of the belt webbing 54 extends across the seat back 22 and across the upper torso of the occupant 52 of the seat 12. The tongue assembly 56 is engaged with a buckle 64 anchored to the vehicle body 20.

One end of the length of belt webbing 54 is connected at an anchor point 66 to the vehicle body 20. From the anchor point 66, the belt webbing 54 extends across the seat bottom cushion 16 to the tongue assembly 56 and the buckle 64. The belt webbing 54 then extends from the tongue assembly 56 across the torso of the vehicle occupant 52 to a D-ring 68 supported on the vehicle 3-pillar 46. The belt webbing 54 extends downward from the D-ring 68 to a seat belt webbing retractor 70 (FIG. 2) which is supported in a known manner on the vehicle body 20.

The vehicle safety apparatus 10 includes an air bag module 80 which is mounted in the vehicle seat 12. The module 80 includes an air bag 90 which is inflatable into a position as seen in FIG. 2 to help protect both the head and the thorax of the vehicle occupant 52. The air bag 90 is a single air bag which includes a head portion 100, a thorax portion 110 and an elongate neck portion 120. The neck portion 120 of the air bag 90 extends between and interconnects the head portion 100 and the thorax portion 110 of the air bag.

Figure 7:
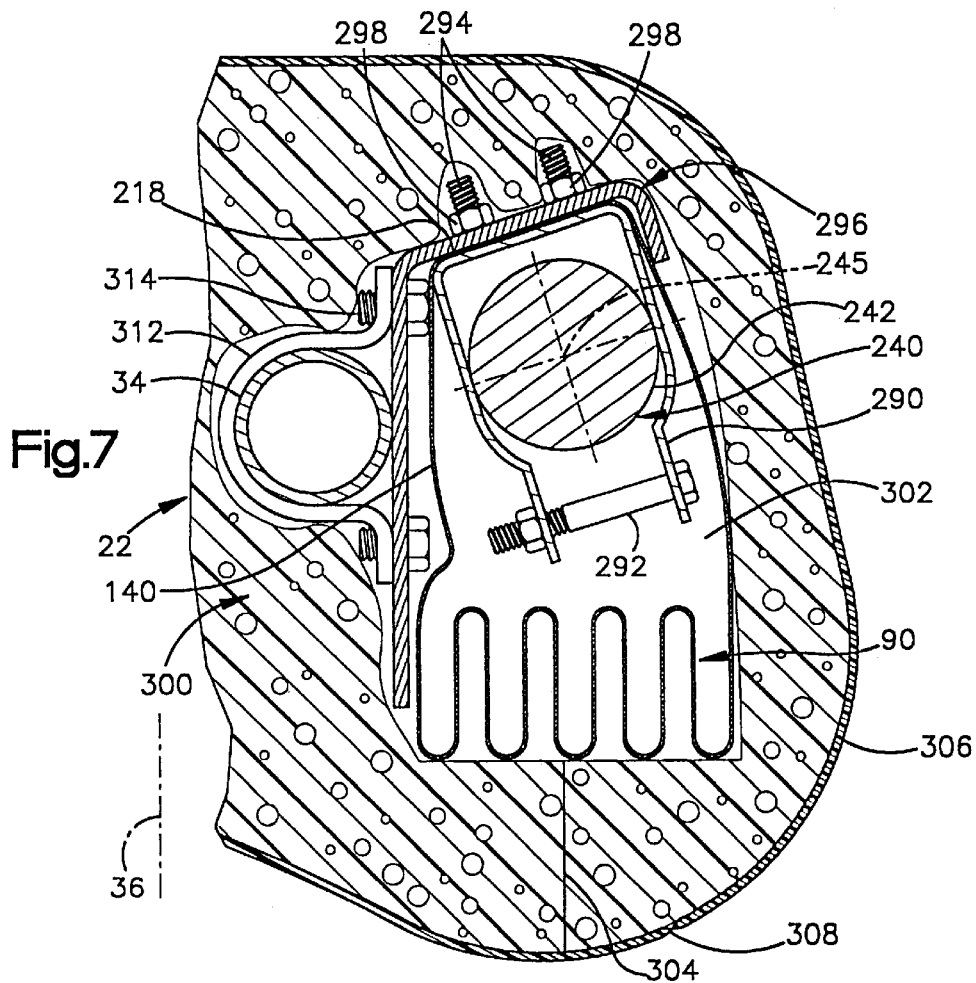
FIG. 7 is a transverse sectional view of a portion of the seat and air bag module of FIG. 1.

The air bag 90 is formed from two separate fabric material panels, that is, an outer panel 130 (FIGS. 1, 2 and 14) and an inner panel 140 (FIG. 7). The panels 130 and 140 are sewn together to form the air bag 90 including the head portion 100 and the thorax portion 110 and the neck portion 120. The panels 130 and 140 are substantially identical to each other and, therefore, only the outer panel 130 will be described in detail.

The outer panel 130 (FIGS. 1, 2 and 14) is a single piece of fabric material, such as woven nylon, which has a configuration substantially similar to that of the inflated air bag 90. FIG. 14 shows a flat plan view of the air bag 90 alone, in a condition after sewing of the panels 130 and 140 but prior to inversion. In FIG. 14, the inner panel 140 underlies the outer panel 130 and thus is not visible.

The outer panel 130 has a paddle-shaped head portion 132, an elongate neck portion 134, and a generally rectangular thorax portion 136. The head portion 132 of the outer panel 130 includes a neck section 160 and an oblong, circular body section 162. A central axis 164 of the head portion 100 of the air bag 90 extends through the head portion 132 of the outer panel 130. In the air bag 90 illustrated in the drawings, the axis 164 extends at an angle of about 90° to the neck portion 120 of the air bag. A terminal end 168 of the head portion 100 of the air bag 90 is disposed on the axis 164.

The body section 162 of the head portion 132 of the outer panel 130 (FIG. 14) has an arcuate outer peripheral end portion 166 which is centered on the axis 164. The arcuate end portion 166 merges into parallel, axially extending side portions 170 and 172. The side portions 170 and 172 merge into arcuate side portions 174 and 176, respectively, disposed adjacent to the neck section 160 of the outer panel 130.

The neck section 160 of the head portion 132 of the outer panel 130 is defined generally by parallel side portions 180 and 182. The one side portion 180 merges via an arcuate corner portion 184 with the arcuate side portion 174 of the body section 162 of the head portion 132 of the outer panel 130. The other side portion 182 of the neck section 160 merges with the elongate neck portion 134 of the outer panel 130. A reinforcing panel 186 is sewn to the neck section 160 of the head portion 132 of the outer panel 130.

For purposes of illustration, it can be considered that the dividing line between the neck section 160 and the body section 162 of the outer panel 130 of the air bag 90 is along an imaginary line 190 (FIG. 14). The imaginary line 190 extends generally perpendicular to the axis 164 of the head portion 100 of the air bag 90. It should be understood that the neck section 160 and the body section 162 of the outer panel 130 are not discrete parts of the outer panel, but rather are portions of the outer panel which gradually merge into each other.

A pair of vents illustrated schematically at 192 are disposed in the body section 162 of the outer panel 130 of the air bag 90. The vents 192 are of a known construction suitable for venting inflation fluid from the air bag 90 after deployment.

The neck portion 134 of the outer panel 130 is generally rectangular in configuration when laid flat as seen in FIG. 14. The neck portion 134 has parallel first and second side portions 200 and 202. An upper end portion 204 of the neck portion 134 of the outer panel 130 merges with the neck section 160 of the head portion 132 of the outer panel. A lower end portion 206 of the neck portion 134 of the outer panel 130 merges with the thorax portion 136 of the outer panel.

The thorax portion 136 of the outer panel 130 has parallel upper and lower side portions 210 and 212 which extend between parallel front and rear side portions 214 and 216. A mounting flap 218 of the outer panel 130 extends from the rear side portion 216 of the thorax portion 136 of the outer panel 130. A plurality of fastener openings 220 are formed in the mounting flap 218.

The inner panel 140 (FIG. 1) of the air bag 90 does not include vents such as the vents 192 in the outer panel 130. The inner panel 140 is otherwise identical to the outer panel 130. The inner panel 140 includes a paddle-shaped head portion 224, an elongate neck portion 226, and a generally rectangular thorax portion 228. A reinforcing panel (not shown) similar to the reinforcing panel 186 (FIG. 14) is sewn to the inner panel 140 at a location opposite from and adjacent to the reinforcing panel 186.

The air bag 90 is assembled in a known manner by stitching the outer panel 130 to the inner panel 140 around the outer periphery of the panels, leaving an assembly opening between the mounting flap 218 of the outer panel 130 and the mounting flap of the inner panel 140. Next, the air bag 90 is turned inside out, or inverted, by pulling the panels 130 and 140 through the assembly opening between the outer panel and the inner panel. The seams of the air bag 90 are top stitched in a known manner. A tether indicated schematically at 230 is sewn between and extends between the inner side surface of the outer panel 130 and the inner side surface of the inner panel 140.

The head portion 100 (FIG. 1) of the assembled air bag 90 is made up of the head portion 132 of the outer panel 130 and the head portion 224 of the inner panel 140. The head portion 100 of the air bag 90 defines a head chamber of the single inflation fluid volume of the air bag. The head portion 100 of the air bag 90 has a generally paddle-shaped configuration when inflated, including a neck section 234 (FIG. 2) and a body section 236. The neck section 234 of the head portion 100 of the air bag 90, when inflated, has a relatively small height measured in a direction perpendicular to the axis 164. The body section 236 of the head portion 100 of the air bag 90, when inflated, has a relatively large height as measured in a direction perpendicular to the axis 164. The body section 236 may have a height which is in the range of from about twice the height of the neck section 234 to about four times the height of the neck section.

The neck portion 120 (FIG. 1) of the air bag 90 is made up of the neck portion 134 of the outer panel 130 and the neck portion 226 of the inner panel 140. The neck portion 120 defines a neck chamber of the single inflation fluid volume of the air bag 90. The neck portion 120 of the air bag 90 has a tubular, cylindrical configuration when inflated.

The thorax portion 110 of the air bag 90 is made up of the thorax portion 136 of the outer panel 130 and the thorax portion 228 of the inner panel 140. The thorax portion 110 defines a thorax chamber of the single inflation fluid volume of the air bag 90. The thorax portion 110 of the air bag 90 has a pillow-shaped configuration when inflated.

The air bag module 80 includes an inflator 240 (best seen in FIG. 3) for inflating the air bag 90. The inflator 240 is mounted inside the air bag 90 in a manner described below. The inflator 240 is illustrated as an inflator which contains a stored quantity of pressurized inflation fluid in the form of gas to inflate the air bag 90. The air bag module 80 alternatively could include an inflator which contains a combination of pressurized inflation fluid and ignitable material for heating the inflation fluid, or a pyrotechnic inflator which uses the combustion of gas-generating material to generate inflation fluid.

The inflator 240 has an elongate cylindrical configuration. A main body portion 242 of the inflator 240 has a cylindrical outer surface 244 which extends parallel to a longitudinal axis 245 of the inflator. The longitudinal axis 245 forms a longitudinal axis of the air bag module 80. In the illustrated embodiment, the axis 245 extends perpendicular to the axis 164 of the head portion 100 of the air bag 90.

A lower end portion 246 of the inflator 240 has one or more inflation fluid outlets 248 for directing inflation fluid into the air bag 90 upon actuation of the inflator. The inflator 240 has no inflation fluid outlets other than the outlets 248 in the lower end portion 246. Alternatively, the air bag module 80 could include an inflator having inflation fluid outlets at a location other than the lower end portion 246, in combination with a diffuser or other structure (not shown) for directing inflation fluid from the inflator into the air bag 90 at the location of the lower end portion 246. The inflation fluid from the inflator of the air bag module 80 is, in a manner described below, preferably directed into the thorax portion 110 of the air bag 90.

A guide pin 250 (FIGS. 3–5) is located on an upper end portion 252 of the inflator 240. The guide pin 250 projects radially outward from the upper end portion 252 of the inflator 240.

A support member or support tube 260 is mounted on the upper end portion 252 of the inflator 240 for sliding movement relative to the inflator. The support tube 260 has a tubular cylindrical configuration and is closely fitted around the cylindrical upper end portion 252 of the inflator 240. A thin-walled portion 262 of the support tube 260 has parallel, cylindrical inner and outer side surfaces 264 and 266 which extend between upper and lower end surfaces 268 and 270, respectively, of the support tube.

A pair of radially thickened mounting portions 272 and 274 of the support tube 260 are spaced apart axially along the length of the support tube. The upper mounting portion 272 is disposed adjacent to the upper end surface 268 of the support tube 260. The mounting portions 272 and 274 can be formed by, for example, welding of separate ring-shaped members to the thin-walled portion 262 of the support tube 260. The mounting portions 272 and 274 can alternatively be formed as one piece with the thin-walled portion 262 of the support tube 260.

A guide slot 276 is formed in the support tube 260. The guide pin 250 on the inflator 240 is slidably received in the guide slot 276 in the support tube 260. The guide slot 276 extends axially from the upper end surface 268 of the support tube 260 in a direction toward the lower end surface 270. A lower end portion 278 of the guide slot 276 is spaced apart from the lower end surface 270 of the support tube 260. The guide slot 276 extends radially completely through the thin-walled portion 262 of the support tube 260, that is, between the inner side surface 264 and the outer side surface 266. The guide slot 276 extends through the radially inner portions only of the mounting portions 272 and 274 of the support tube 260.

A clamping plate 280 is associated with the support tube 260 for clamping the head portion 100 of the air bag 90 to the support tube, in a manner described below. The clamping plate 280 has an arcuate configuration centered on the axis 245 and extends axially between the mounting portions 272 and 274 of the support tube 260. A pair of fasteners 282 are associated with the clamping plate 280 for securing the clamping plate to the support tube 260 in a manner described below.

In assembly of the air bag module 80, a clamping tube 290 (FIGS. 3 and 7) is first placed around the inflator 240 near the lower end portion 246 of the inflator. The clamping tube 290 has a generally U-shaped cross-sectional configuration as best seen in FIG. 7. A series of fasteners 292 clamp the clamping tube 290 to the main body portion 242 of the inflator 240. A series of mounting bolts 294 project from the clamping tube 290 in a direction away from the inflator 240.

The inflator 240 is next assembled with the air bag 90, by inserting the inflator and the clamping tube 290 through the assembly opening between the outer panel 130 and the inner panel 140, into the inflation fluid volume of the air bag. The upper end portion 252 of the inflator 240, and the support tube 260, are disposed inside the head portion 100 of the air bag 90. The main body portion 242 of the inflator 240 extends through both the neck portion 120 and the thorax portion 110 of the air bag 90. The inflation fluid outlets 248 on the inflator 240 are disposed inside the thorax portion 110 of the air bag 90.

The clamping plate 280 is placed on the outside of the reinforcing panels on the head portion 100 of the air bag 90. The fasteners 282 extend through the clamping plate 280, the reinforcing panels, and the head portion 100 of the air bag 90. The fasteners 282 are screwed into the support tube 260. The head portion 100 of the air bag 90 is thereby secured to and connected for movement with the support tube 260.

After the inflator 240 and the clamping tube 290 are thus disposed in the air bag 90, the mounting flap 218 of the outer panel 130 and the mounting flap of the inner panel 140 are folded to overlie the clamping tube. The mounting bolts 294 on the clamping tube 290 extend through the fastener openings 220 in the mounting flap 218 and through the fastener openings in the mounting flap of the inner panel. The mounting bolts 294 on the clamping tube 290 are inserted into fastener openings in a mounting bracket 296 (FIG. 7). Nuts 298 are screwed onto the mounting bolts 294 to secure the inflator 240, the air bag 90, and the clamping tube 290 to the mounting bracket 296.

The air bag 90 is then folded into a condition shown schematically in FIG. 3. In the process of folding, the head portion 100 of the air bag 90, the outer peripheral side portion 166 (FIGS. 13 and 14) of the air bag, including the terminal end 168, is tuck folded inside the body section 236 of the head portion of the air bag, to a condition as shown schematically in FIG. 12. Next, the entire body section 236 of the head portion 100 of the air bag 90 is tuck folded inside the neck section 234 of the head portion of the air bag as shown schematically in FIG. 11. As a result, the body section 236 of the head portion 100 of the air bag 90 is folded in a tight clump within the folded neck section 234 of the head portion of the air bag.

Figure 9:
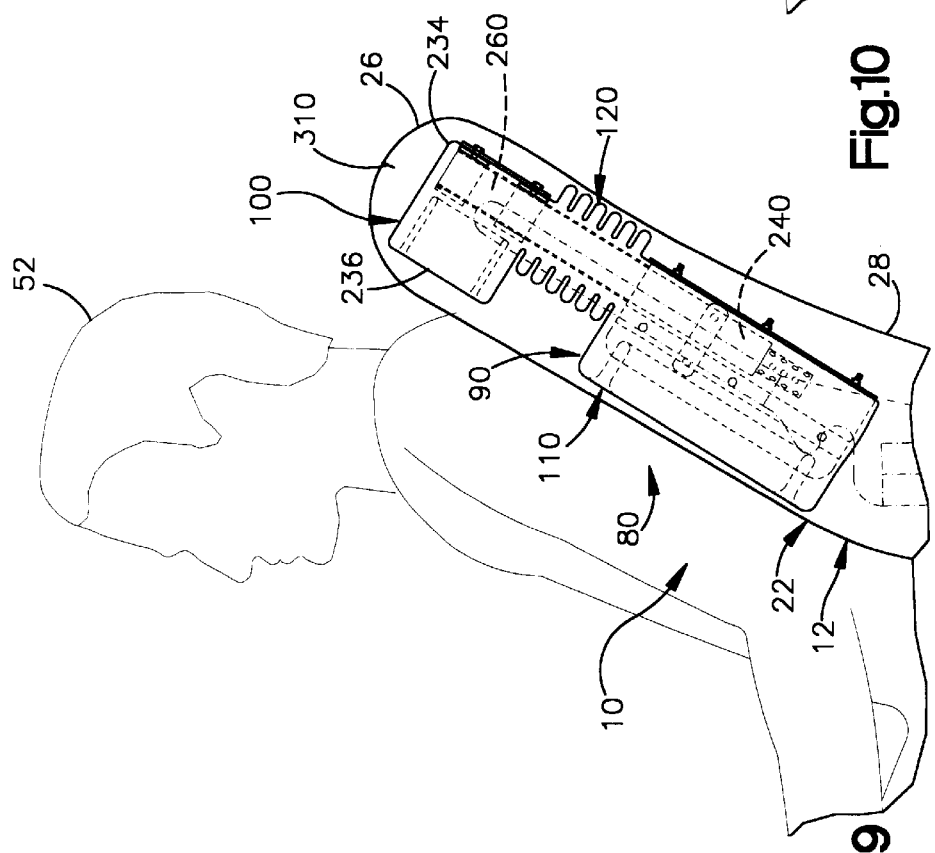
FIG. 9 is a view of a portion of the seat and air bag module of FIG. 1, showing the air bag in a deflated, folded condition.

The neck portion 120 of the air bag 90 is accordion folded along the main body portion 242 of the inflator 240, as illustrated schematically in FIG. 9. The thorax portion 110 of the air bag 90 is folded adjacent to the main body portion 242 and lower end portion 246 of the inflator 240, as illustrated schematically in FIG. 3.

The mounting bracket 296 is secured to the seat frame member 34 of the seat back 22 of the vehicle seat 12 to mount the air bag module 80 in the vehicle seat. The seat back 22 (FIG. 7) includes a body of foam seat cushion material 300 which surrounds the tubular seat frame member 34. A cavity 302 is formed in the body of foam material 300 adjacent to a parting line 304 of the foam material. A seat covering 306 of the seat back 22, such as cloth or leather, encloses the body of foam material 300 and the seat frame member 34. The seat covering 306 includes a first seam 308 (FIG. 7) which extends generally vertically along the forward edge of the side bolster of the vehicle seat back 22. The seat covering 306 has a second seam 310 (FIGS. 3, 9 and 10) which extends generally horizontally along the top of the vehicle seat back 22.

The mounting bracket 296 is secured to the seat frame member 34 with suitable fastening means such as a clamp 312 and fasteners 314. The air bag module 80 is disposed inside the cavity 302 in the seat back 22. The folded air bag 90 is presented in a generally forward direction toward the parting line 304 of the foam material. Specifically, the module 80 is mounted in the vehicle seat back 22 such that the inflator 240 faces forward and outward at an angle to the front to back axis 36. in a preferred embodiment, the module 80 is mounted in the vehicle seat back 22 so that the guide pin 250 (FIG. 4) on the inflator 240 extends forward and at an angle of 20° to 25° outward of the front to back axis 36.

The vehicle safety apparatus 10 includes known electrical means indicated schematically at 320 (FIG. 1) for sensing a side impact to the vehicle 14 and for actuating the inflator 240 in response to the sensing of a side impact. The electrical means 320 includes a power source, which is preferably the vehicle battery and/or a capacitor, and a normally open switch. The switch is part of a side impact sensor which senses a condition indicating the occurrence of a side impact to the vehicle 14. If the collision-indicating condition sensed by the sensor is above a predetermined threshold, it indicates the occurrence of a side impact to the vehicle for which inflation of the air bag 90 is desired to help protect the occupant of the vehicle. The sensor then closes the switch, and the electrical means 320 sends an actuation signal to the inflator 240 over lead wires 322.

The inflator 240 is actuated in a known manner and directs inflation fluid under pressure into the air bag 90 through the fluid outlet openings 248 in the lower end portion 246 of the inflator. The lower end portion 246 of the inflator 240 is disposed in the thorax portion 110 of the air bag 90. Therefore, all the inflation fluid from the inflator 240 flows directly into the thorax portion of the air bag 90. After the thorax portion 110 of the air bag 90 inflates as described below, the inflation fluid flows from the thorax portion of the air bag into the neck portion 120 and thence into the head portion 100 of the air bag. The air bag 90 inflates in a manner as indicated schematically in FIGS. 9–13.

The inflation fluid from the inflator 240 pressurizes and inflates the thorax portion 110 of the air bag 90 first. The thorax portion 110 inflates out of the seam 308, in the covering 306 of the seat back 22. The thorax portion 110 of the air bag 90 inflates from a folded and stored condition as illustrated in FIG. 9 through a partially inflated condition as illustrated in FIGS. 10 and 11 to a fully inflated condition as illustrated in FIGS. 12–13.

During inflation of the thorax portion 110 of the air bag 90, the narrow neck portion 120 of the air bag 90 acts as a choke to block the flow of inflation fluid into the head portion 100 of the air bag. Once the thorax portion 110 of the air bag 90 is fully inflated, inflation fluid is forced out of the thorax portion of the air bag into the neck portion 120 of the air bag. Also, inflation fluid is forced out of the thorax portion 110 of the air bag 90 into the neck portion 120 of the air bag when the thorax portion 110 of the air bag is engaged or loaded in a side impact crash by contact with the vehicle occupant 52. This loading of the thorax portion 110 of the air bag 90 typically occurs well before the head portion of the air bag begins to inflate.

Figure 10:
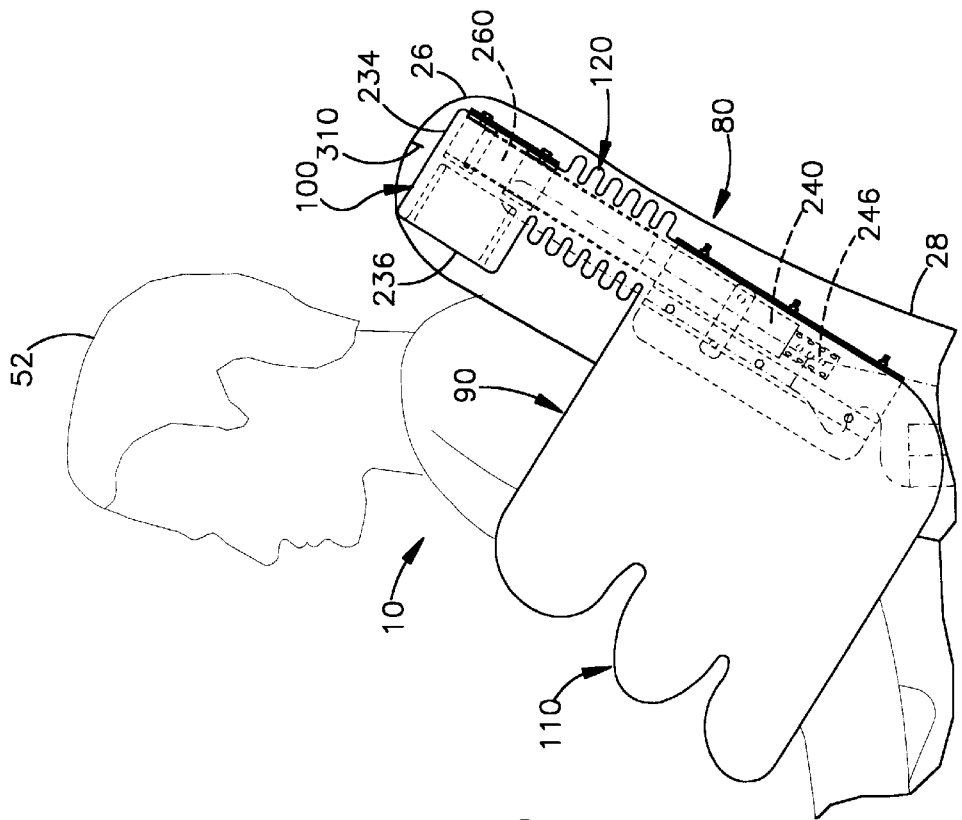
FIG. 10 is a view similar to FIG. 9 showing the air bag in a first, partially inflated condition.

As the pressure of the inflation fluid in the neck portion 120 of the air bag 90 increases, the neck portion of the air bag inflates through a condition shown schematically in FIG. 10 to a condition shown schematically in FIG. 11. The folded neck portion 120 of the air bag 90 elongates. Some of the inflated neck portion 120 of the air bag 90 may extend out of the seat back 22 through the side seam 308. Most of the inflated neck portion 120 of the air bag 90 remains inside the vehicle seat back 22.

The inflation fluid flowing into the neck portion 120 of the air bag contacts or engages the head portion 100 of the air bag. When the pressure of the inflation fluid in the neck portion 120 of the air bag 90 increases sufficiently, the force exerted by the fluid pressure in the air bag pushes the folded head portion 100 of the air bag upward against the seam 310 (FIGS. 3 and 9–13) in the upper portion 26 of the vehicle seat back 22. The seam 310 opens and the folded head portion 100 of the air bag 90, along with the support tube 260, moves upward relative to the vehicle seat back 22 and out of the seat back through the seam 310 as shown in FIG. 11.

The moving folded head portion 100 of the air bag 90 pulls the support tube 260 upward relative to the inflator 240. The support tube 260 is moved because of the vertical component of the force applied to the head portion 100 of the air bag 90 by the pressure of the inflation fluid in the air bag. The support tube 260 slides along the upper end portion 252 of the inflator 240 and guides the head portion 100 of the air bag 90 to move upward prior to inflation of the head portion of the air bag in a forward direction. The head portion 100 of the air bag 90 then inflates forward and outward into a position to protect the vehicle occupant, as indicated schematically in FIGS. 12 and 13.

The head portion 100 of the air bag 90 does not unfold and inflate until it is moved up out of the vehicle seat back 22 to the position shown in FIG. 11. This is because less force is required to unfold the neck portion 120 of the air bag and move the folded head portion 100 and the support tube 260 upward through the seam 310, than is required to unfold the head portion 100 of the air bag. As a result, the head portion 100 of the air bag 90 does not inflate until both the thorax portion 110 and the neck portion 120 of the air bag are already inflated. The time of inflation of the head portion 100 of the air bag 90, relative to the time of inflation of the thorax portion 110 of the air bag, can be tailored by adjusting the size of the thorax portion 110 of the air bag, the configuration of the neck portion 120 of the air bag, and the diameter of the neck portion 120.

The lower end 278 of the guide slot 276 (FIGS. 4–6) engages the guide pin 250 to limit the upward movement of the support tube 260 relative to the inflator 240. The limiting of the upward movement of the support tube 260 limits the vertical movement of the head portion 100 of the air bag 90 and thus controls the vertical position or height of the head portion 100 of the air bag. The reinforcing panel 186 on the outer panel 130 and the reinforcing panel on the inner panel 140 resist the shear forces attempting to pull the air bag 90 off the support tube 260 at the point of attachment of the clamp plate 280 and fasteners 282.

When the air bag 90 is in the inflated condition, the body section 236 of the head portion 100 of the air bag is disposed forward of, and extends forward from, the neck section 234 of the head portion 100 of the air bag. When the air bag 90 is in the inflated condition, the rear side portion 216 of the thorax portion 110 of the air bag is disposed in the vehicle seat back 22. The front side portion 214 of the thorax portion 110 of the air bag extends forward, out of the vehicle seat back 22, from the side portion 216. The neck section 234 of the head portion 100 of the air bag 90, the rear side portion 216 of the thorax portion 110 of the air bag, and the neck portion 120 of the air bag, are disposed in a generally linear array within the vehicle seat back 22.

The air bag module 80 is mounted on the seat frame member 34 so that the air bag 90 deploys in a forward and outward direction relative to the front-to-back axis 36. Specifically, the support tube 260 is angled outward relative to the front-to-back axis 36 at the same angle at which the thorax portion 110 of the air bag inflates. The engagement of the guide pin 250 on the inflator in the guide slot 276 in the support tube 260 maintains this angular position of the support tube as the support tube moves relative to the inflator. The inflator 240 is rigidly mounted in the vehicle seat back 22. Because the support tube 260 is maintained at a predetermined angle relative to the front-to-back axis 36, the head portion 100 of the air bag 90 also is maintained at the same predetermined angle. Thus, the head portion 100 of the air bag is caused to deploy at approximately a right angle to the seat back and outward relative to the front-to-back axis 36 at the desired predetermined angle.

In a preferred embodiment of the invention, the head portion 100 of the air bag 90 inflates and deploys at an angle of about 20° to 25° outward of the front-to-back axis 36. This selected angle of deployment minimizes the possibility of the inflating air bag engaging and being caught on the vehicle door 40 or the seat belt 60. This also helps to avoid engaging the head of an out-of-position occupant 52 as the air bag 90 inflates into a position adjacent to or past the occupant's head.

The head portion 100 of the air bag 90 billows out to a position between the head and the neck of the occupant 52 of the vehicle 14, and the vehicle window 42 or B-pillar 46. The inflated air bag 90 is located between the occupant 52 and the shoulder belt portion 60 of the belt webbing 54 adjacent the D-ring 68. The air bag 90 extends between the seat 12 and the door 40 to help protect the occupant 52 of the seat from a forceful impact with the door. The inflated air bag 90 can also help protect the occupant 52 from an object intruding through the door 40 or window 42 into the passenger compartment of the vehicle 14.

Because of the narrow tubular configuration of the neck section 234 (FIG. 12) of the head portion 100 of the air bag 90, the inflating head section 236 of the air bag stays in a tight bundle or small clump as the neck section 234 unfolds and inflates. When the neck portion 234 of the head portion 100 of the air bag 90 is inflated, and inflation fluid begins to flow into the body section 236, the body section 236 is still, to a large extent, folded as shown schematically in FIG. 12. The body section 236 of the head portion 100 of the air bag 90 then inflates, to the condition shown in FIG. 13. The low pressure created by the vents 192 ensures that the inflation fluid flows through the body section 236 of the head portion 100 and inflates the body portion fully. The time required for inflation of the head portion 100 of the air bag 90 is greater than the time required for inflation of the thorax portion 110 of the air bag. This reduces the speed of the deploying head portion 100 of the air bag 90. This reduces the impact force of the head portion 100 to an out-of-position vehicle occupant 52, such as one leaning against the vehicle door 40.

When the air bag 90 is in the inflated condition, the head portion 100 of the air bag has a width as measured in a generally forward direction in the vehicle (that is, along the axis 164) which is at least about three times the width of the neck portion 120 of the air bag as measured in the same generally forward direction. Also, when the air bag 90 is in the inflated condition, the thorax portion 110 of the air bag has a width as measured in the same generally forward direction in the vehicle which is at least about three times the width of the neck portion 120 of the air bag as measured in the same direction. Specifically, when the air bag 90 is in the inflated condition, the head portion 100 of the air bag and the thorax portion 110 of the air bag each preferably have a width as measured in the generally forward direction in the vehicle which is in the range of from about three times the width of the neck portion 120 of the air bag to about twelve times the width of the neck portion of the air bag as measured in the generally forward direction.

Figure 8:
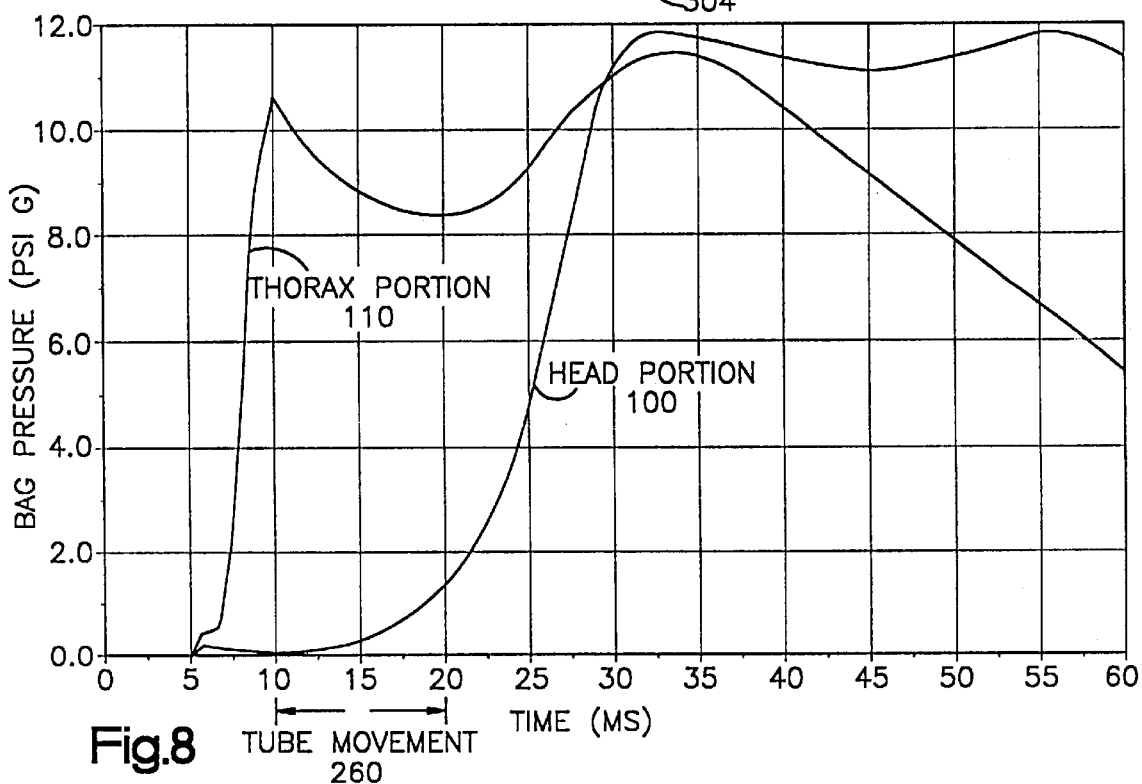
FIG. 8 is a graph plotting inflation pressure against time for two portions of the air bag of FIG. 1.

In one air bag 90 constructed in accordance with the present invention, the thorax portion 110 (FIG. 8) of the air bag reaches full inflation at about 10 milliseconds after actuation of the inflator 240. The support tube 260 begins to move relative to the inflator 240 at about 10 milliseconds after actuation of the inflator. The support tube 260 finishes moving at about 20 milliseconds after actuation of the inflator 240. The vehicle occupant 52 fully loads the thorax portion 110 of the air bag at about 20 milliseconds after actuation of the inflator 240. The head portion 100 of the air bag 90 reaches full inflation at about 30 to 35 milliseconds after actuation of the inflator 240.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus for helping to protect an occupant of a vehicle in the event of a side impact to the vehicle, said apparatus comprising:

an inflatable vehicle occupant protection device for, when inflated, helping to protect the vehicle occupant, said inflatable device having a deflated, folded condition and an inflated condition;

an inflator for, when actuated, supplying inflation fluid to said inflatable device to inflate said inflatable device;

said inflatable device having a thorax portion for receiving inflation fluid from said inflator and a head portion;

a support for said head portion of said inflatable device when said inflatable device is in the deflated condition; and means for mounting said support and said head portion of said inflatable device for movement from a first position in a first direction away from said thorax portion of said inflatable device to a second position from which said head portion inflates in a second direction into a position to help protect the vehicle occupant.

2. An apparatus as set forth in claim 1, wherein said first direction is an upward direction in the vehicle and said second direction is a forward direction in the vehicle.

3. An apparatus as set forth in claim 1, further comprising a seat for supporting an occupant of the vehicle in a seated position in the vehicle, said seat including a seat bottom portion and a seat back, said apparatus further comprising means for mounting said inflator and said inflatable device and said support in said vehicle seat back with said inflatable device in the deflated condition.

4. An apparatus as set forth in claim 1 wherein said thorax portion of said inflatable device inflates in about 10 milliseconds after actuation of said inflator, said support moving from the first position to the second position at about 10 to 20 milliseconds after actuation of said inflator.

5. A vehicle occupant safety apparatus for helping to protect an occupant of a vehicle in the event of a side impact to the vehicle, said apparatus comprising:

an inflatable vehicle occupant protection device for, when inflated, helping to protect the vehicle occupant, said inflatable device having a deflated, folded condition and an inflated condition;

an inflator for, when actuated, supplying inflation fluid to said inflatable device to inflate said inflatable device;

said inflatable device having a thorax portion for receiving inflation fluid from said inflator and a head portion;

a support for said head portion of said inflatable device when said inflatable device is in the deflated condition; and means for mounting said support and said head portion of said inflatable device for movement from a first position in a first direction away from said thorax portion of said inflatable device to a second position from which said head portion inflates in a second direction into a position to help protect the vehicle occupant;

further comprising a seat for supporting an occupant of the vehicle in a seated position in the vehicle, said seat including a seat bottom portion and a seat back, said apparatus further comprising means for mounting said inflator and said inflatable device and said support in said vehicle seat back with said inflatable device in the deflated condition; and wherein said support is supported for movement from a first position which is inside of said seat back to a second position which is outside of said seat back in response to actuation of said inflator.

6. A vehicle occupant safety apparatus for helping to protect an occupant of a vehicle in the event of a side impact to the vehicle, said apparatus comprising:

an inflatable vehicle occupant protection device for, when inflated, helping to protect the vehicle occupant, said inflatable device having a deflated, folded condition and an inflated condition;

an inflator for, when actuated, supplying inflation fluid to said inflatable device to inflate said inflatable device;

said inflatable device having a thorax portion for receiving inflation fluid from said inflator and a head portion;

a support for said head portion of said inflatable device when said inflatable device is in the deflated condition; and means for mounting said support and said head portion of said inflatable device for movement from a first position in a first direction away from said thorax portion of said inflatable device to a second position from which said head portion inflates in a second direction into a position to help protect the vehicle occupant;

wherein said support is disposed inside said inflatable device.

7. A vehicle occupant safety apparatus for helping to protect an occupant of a vehicle in the event of a side impact to the vehicle, said apparatus comprising:

an inflatable vehicle occupant protection device for, when inflated, helping to protect the vehicle occupant, said inflatable device having a deflated, folded condition and an inflated condition;

an inflator for, when actuated, supplying inflation fluid to said inflatable device to inflate said inflatable device;

said inflatable device having a thorax portion for receiving inflation fluid from said inflator and a head portion;

a support for said head portion of said inflatable device when said inflatable device is in the deflated condition; and means for mounting said support and said head portion of said inflatable device for movement from a first position in a first direction away from said thorax portion of said inflatable device to a second position from which said head portion inflates in a second direction into a position to help protect the vehicle occupant;

wherein said support is mounted on said inflator for sliding movement relative to said inflator.

8. A vehicle occupant safety apparatus for helping to protect an occupant of a vehicle in the event of a side impact to the vehicle, said apparatus comprising:

a seat for supporting an occupant of the vehicle in a seated position in the vehicle, said seat including a seat bottom portion and a seat back;

an inflatable vehicle occupant protection device for, when inflated, helping to protect the vehicle occupant, said inflatable device defining a single inflation fluid volume and having a deflated, folded condition and an inflated condition;

said inflatable device having a thorax portion which is inflatable into a position to help protect the thorax of the vehicle occupant and a head portion which is inflatable into a position to help protect the head of the vehicle occupant;

an inflator for, when actuated, supplying inflation fluid to said inflatable device to inflate said inflatable device; and means for mounting said inflator and said inflatable device in said vehicle seat back with said thorax portion and said head portion in the folded condition;

said head portion of said inflatable device unfolding and inflating from said vehicle seat back after said thorax portion of said inflatable device unfolds and inflates from said vehicle seat back;

each one of said head portion and said thorax portion of said inflatable device when inflated having a width as measured in a generally forward direction of the vehicle;

said inflatable device further comprising a neck portion of said inflatable device which extends between said head portion and said thorax portion and which connects said head portion in fluid communication with said thorax portion, said neck portion of said inflatable device when inflated having a relatively small width as compared to the widths of said head portion and said thorax portion as measured in said generally forward direction of the vehicle;

said inflator including a first section disposed within said thorax portion of said inflatable device and a second section disposed within said neck portion and said head portion of said inflatable device, said first section of said inflator including inflation fluid outlet means disposed within said thorax portion of said inflatable device for directing inflation fluid from said inflator into said thorax portion of said thorax portion of said inflatable device, said second section of said inflator being free of inflation fluid outlets.

* * * * *